J. M. DAVIDSON.
APPARATUS FOR SEWAGE DISPOSAL.
APPLICATION FILED NOV. 29, 1912. RENEWED APR. 9, 1915.
1,139,402.
Patented May 11, 1915.
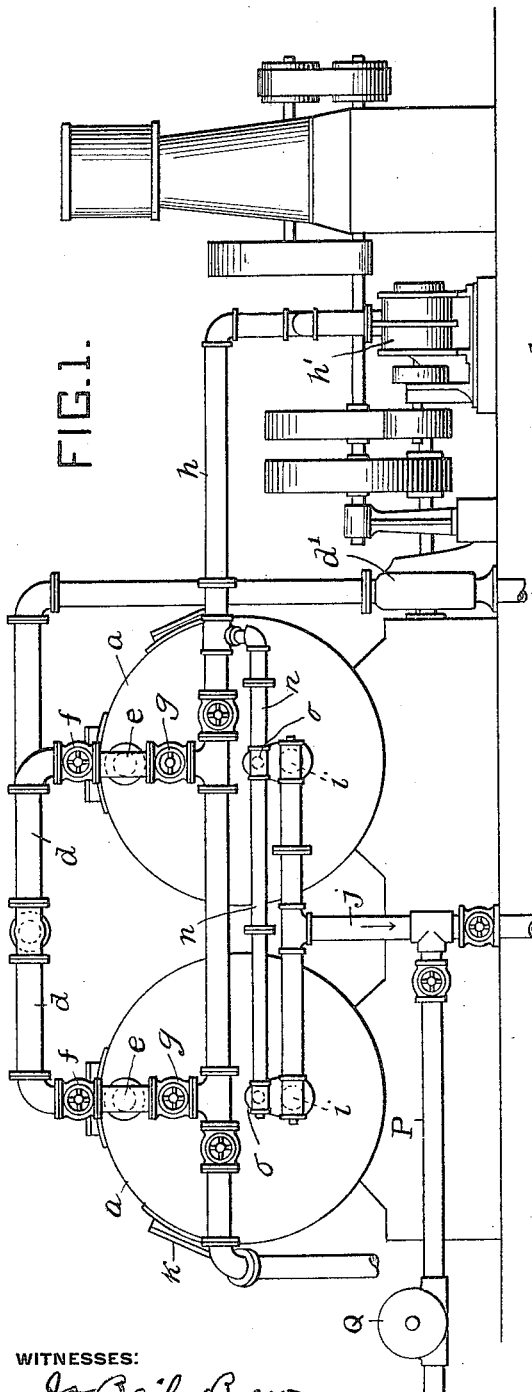
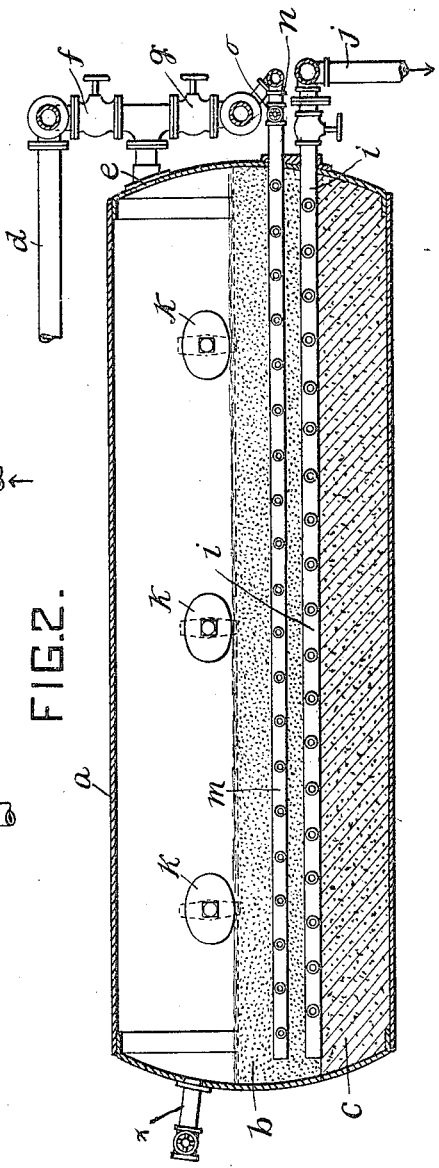
WITNESSES:
INVENTOR
John M. Davidson
Atty

UNITED STATES PATENT OFFICE.

JOHN M. DAVIDSON, OF PITTSBURGH, PENNSYLVANIA, ASSIGNOR TO WM. B. SCAIFE & SONS COMPANY, OF PITTSBURGH, PENNSYLVANIA, A CORPORATION OF NEW JERSEY.

APPARATUS FOR SEWAGE DISPOSAL.

1,139,402.

Specification of Letters Patent.

Patented May 11, 1915.

Application filed November 29, 1912, Serial No. 733,969. Renewed April 9, 1915. Serial No. 20,337.

*To all whom it may concern:*

Be it known that I, JOHN M. DAVIDSON, a citizen of the United States, residing at Pittsburgh, in the State of Pennsylvania, have invented certain new and useful Improvements in Apparatus for Sewage Disposal, of which the following is a specification.

My invention relates to the art of separating and removing the insoluble matter from sewage or other waste-carrying liquid discharges, and it is particularly designed to provide for forcing out the liquid part of the waste by compressed air and leaving the insoluble matter in a comparatively dry and solid state which renders it readily removable from the apparatus employed.

A further object is to provide for separating and saving the sedimentary portion of the waste from sewage, where desirable, and to render harmless the sewage from such plants as are under legal obligation to clarify their sewage before discharging it into a lake, stream, or the like.

I have shown in the accompanying drawing a convenient construction of apparatus for carrying out my invention.

Figure 1 is an end elevation of the apparatus, showing the general arrangement with two filter tanks, piping, engine, and air compressor. Fig. 2 is a longitudinal vertical section of one of the filter tanks, showing the interior arrangement.

Not only has the problem of disposal of sewage of an offensive character been a very serious one heretofore, but there are many cases, such as the sewage of glue factories, slaughter houses, and the like, in which the sewage contains a great deal of matter valuable as fertilizer or even for food for animals. Heretofore where attempts have been made to separate the solid matter it has been done by means of open settling tanks or basins, the sediment being removed by allowing the sewage to stand a long time, then drawing off the water and allowing the sludge to dry in the sun in fields. This is a very offensive process and in many places is prohibited by law. Moreover on account of the difficulties of such processes there has been very little attempt to save the solid matter from the sludge.

By my apparatus I carry the sewage through a pressure filter until there is accumulated a considerable thickness of detritus, and thereupon I draw off the water from the top of the filter and then introduce air pressure to force out the remaining water and dry out the detritus, which thereupon becomes a flexible cake on top of the filter and may be rolled up and removed for such use as it is capable of, as for example fertilizer or chicken feed.

The apparatus preferably employs two or more tanks so that while one is receiving the waste and is filling, the other may be cut off from the supply and used for the process of separation as herein described. For this purpose the piping and valves are arranged so that there is no interruption in the receipt of waste from the supply, and the operation of the apparatus may be continuous.

It is highly desirable also that the filter bed in the closed tank have a large area with respect to the volume of the tank, for two reasons. In the first place, such operations cannot be economically carried on unless the detritus can be quickly disposed of and this quick disposal can only be accomplished by running the water through a proportionally large filter bed so that it can go more rapidly. In the second place, the resulting cake of solid matter should be comparatively thin so that it can be conveniently rolled up or cut up and removed from the tank.

In the drawings *a* is a steel tank of any desired size, built capable of withstanding high interior pressure, and laid horizontally in any convenient form of mounting. The tank is supplied, up to about half its height, with a coarse sand filter bed, *b*, laid on a bed of concrete, *c*. The waste from which the solids are to be removed is pumped under pressure into the tank *a* through pipe *d* at the inlet *e* by pump *d'*. When the filter becomes thickly coated the supply is cut off by closing the valve *f*, the valve *g* is opened, and air is forced into the tank at inlet *e* from the compressor *h'*. Before admitting the air, the water above the level of valve *x* may be thereby drawn off into the supply tank, thus making less water to be forced out. The advisability of this step depends on the character of the waste to be separated, etc., but is nearly always advisable because the primary object is to quickly dry out and remove the cake of solid matter and of course the forcing of a large amount of water through the cake is slow and expensive. As the pressure is applied and increases the liquid matter in the tank is forced through the filter b and is carried off by the perforated pipes i in the filter bed and discharge pipe j.

The insoluble matter in the waste, caught on the surface of the filter bed, is subjected to the flow of air until dried out, when a man enters the tank through manhole k, provided for that purpose, and removes the solid matter from the top of the filter bed.

I find in practice that the solids are left on the top of the filter bed in the form of a tough mat, which is easily rolled up, broken into pieces convenient for handling, and so removed through the manholes. The mat is easily removed from a sand surface; and the sand may be easily washed and used again.

I have also provided a connection by pipe P from the discharge pipe to an exhaust pump Q, so that I may use this means as an auxiliary to the air pressure above, or even without the pressure, the exhaust giving satisfactory results by itself. The result of the use of an exhaust pump in this manner is practically the same as that of a compressor from above.

In the apparatus shown I have provided means for cleaning the filter by stirring up the sand therein, preferably by means of air, by providing in the filter bed a series of spray nozzles m connected to pipe n and thence to the main air pipe h, valves being provided for control as shown in Fig. 1. The presence of air in the filter bed also prevents the clogging of the filter by gases and finer particles of sewage.

By means of the above described apparatus, operated according to the process herein described, I avoid the difficulty of handling the detritus in the form of wet sludge, I save the material in a form which may be easily handled and removed and used, and I purify the sewage water and avoid the offensive smell customary in such operations. Moreover, I accomplish the separation quickly, which from a commercial standpoint is necessary to success; the cost of saving the solid matter should not exceed the value of the material saved.

Other advantages will readily occur to those familiar with the art, and it will be understood that any variations in the form of apparatus which accomplish my process is within the terms of my invention.

Having thus described my invention and illustrated its use, what I claim is:

1. Apparatus for saving the solid matter of sewage, comprising a closed tank of relatively large horizontal dimensions, a sand filter therein having multiple strainer outlets at the bottom, a sewage inlet and pump for forcing the liquid through the filter under pressure, a draw-off pipe above the filter bed, an air inlet above the said pipe, a tank having an opening to remove the cake of solid matter remaining after the air forces the suspended water out of the sludge, substantially as described.

2. A sewage disposal plant comprising a pair of closed pressure tanks having sand filter beds therein of large area compared with the volume of the tank and multiple draw-off and washing pipes under the sand, means to force air upward into the sand, a sewage inlet and pump for forcing sewage through the sand, a draw-off pipe near the sand bed, an air pump, an air inlet above said draw-off pipe and manholes for removal of resulting cake located near the level of the filter bed, substantially as described.

3. Apparatus for saving the solid matter of sewage, comprising a closed tank, a sand filter with a surface of large area compared with the capacity of the tank, a water outlet and a sewage inlet and pump for forcing sewage through the sand, a draw-off pipe and an air inlet pipe above and near the filter bed, an air pump, a series of manholes approximately on a level with the top of the filter, whereby to filter under pressure, then draw-off the surplus water, then expel the water in the sludge on the filter and remove the remaining cake, substantially as described.

In testimony whereof I have hereunto subscribed my name in the presence of the two subscribing witnesses.

JOHN M. DAVIDSON.

Witnesses:
Jo. Baily Brown,
Fredk. Staub.

Copies of this patent may be obtained for five cents each, by addressing the "Commissioner of Patents, Washington, D. C."